(12) United States Patent
Zhang (10) Patent No.: US 12,541,211 B2
(45) Date of Patent: Feb. 3, 2026

(54) UAV SHOOTING METHOD AND APPARATUS, UAV (71) Applicant: AUTEL ROBOTICS CO., LTD., Shenzhen (CN)

(72) Inventor: Yucheng Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 33 days.

(21) Appl. No.: 18/600,287

(22) Filed: Mar. 8, 2024

(65) Prior Publication Data
US 2025/0076899 A1 Mar. 6, 2025

Related U.S. Application Data (63) Continuation of application No. PCT/CN2022/117901, filed on Sep. 8, 2022.

(30) Foreign Application Priority Data

Sep. 10, 2021 (CN) .......................... 202111063768.X (51) Int. Cl.
*B64U 20/87* (2023.01)
*B64U 101/30* (2023.01)
*G05D 1/689* (2024.01)

(52) U.S. Cl.
CPC .............. *G05D 1/689* (2024.01); *B64U 20/87* (2023.01); *B64U 2101/30* (2023.01)

(58) Field of Classification Search
CPC .... G05D 1/689; G05D 2109/20; B64U 20/87; B64U 2101/30; B64U 10/13;

(Continued)

(56) References Cited

U.S. PATENT DOCUMENTS

2016/0306351 A1 10/2016 Fisher et al.
2019/0011922 A1* 1/2019 Feng .................. G05D 1/12
(Continued)

FOREIGN PATENT DOCUMENTS

CN 105549605 A 5/2016
CN 108109171 A 6/2018
(Continued)

OTHER PUBLICATIONS

The International Search Report mailed Dec. 6, 2022; PCT/CN2022/117901.
(Continued)

*Primary Examiner* — Susan E. Hodges (57) ABSTRACT

Embodiments of the present disclosure disclose an unmanned aerial vehicle (UAV) shooting method and apparatus, a UAV and a storage medium. The method includes: determining position information of a target object in a framing picture of a camera, the position information including coordinate information and dimension information of the target object in the framing picture; determining a target heading angle of the UAV and a target pitch angle of a gimbal based on the position information; adjusting the UAV from an initial heading angle to the target heading angle and adjusting the gimbal from an initial pitch angle to the target pitch angle; determining a target shooting position based on a shooting mode of the camera and the position information; and flying to the target shooting position and controlling the camera to shoot the target object at the target shooting position. According to the technical solution provided in the embodiments of the present disclosure, a shooting angle and a shooting position can be accurately adjusted, thereby helping a user compose a captured image of the target object and improving user experience.

20 Claims, 3 Drawing Sheets (58) Field of Classification Search
CPC .... H04N 23/61; H04N 23/632; H04N 23/667; H04N 23/695
USPC ........................................................ 348/144
See application file for complete search history.

(56) References Cited

U.S. PATENT DOCUMENTS

2020/0073385 A1* 3/2020 Jobanputra ............ G06N 20/00
2020/0104598 A1* 4/2020 Qian ...................... G06V 20/20

FOREIGN PATENT DOCUMENTS

| | | |
|---|---|---|
| CN | 108476288 A | 8/2018 |
| CN | 108680143 A | 10/2018 |
| CN | 111272148 A | 6/2020 |
| CN | 113038016 A | 6/2021 |
| CN | 113038023 A | 6/2021 |
| CN | 113747071 A | 12/2021 |
| KR | 20200114924 A | 10/2020 |
| WO | WO2019061063 A1 | 4/2019 |

OTHER PUBLICATIONS

The First Chinese Office Action dated Feb. 3, 2023; Appln. No. 202111063768.X.

* cited by examiner

UAV SHOOTING METHOD AND APPARATUS, UAV

This application is a Continuation of International Application No. PCT/CN2022/117901, filed Sep. 8, 2022, which claims priority to and the benefit of Chinese Patent Application No. 202111063768.X, filed Sep. 10, 2021, the entireties of which are hereby incorporated herein by reference.

BACKGROUND

In recent years, a target may be tracked and shot by using an unmanned aerial vehicle (UAV). In the prior art, a user usually adjusts a heading angle and a navigation position of the UAV manually by using a remote control, and then tracks and shoots the target. However, the prior art cannot accurately adjust the heading angle and the navigation position of the UAV.

Therefore, a captured image of the target cannot achieve a satisfactory effect.

SUMMARY

Embodiments of the present disclosure relate to the field of intelligent technologies for unmanned aerial vehicles (UAVs), and in particular, to a UAV shooting method and apparatus, a UAV and a storage medium.

Embodiments of the present disclosure provide an unmanned aerial vehicle (UAV) shooting method and apparatus, a UAV and a storage medium, so as to accurately adjust a shooting angle and a shooting position, thereby helping a user compose a captured image of the target object and improving user experience.

According to a first aspect, an embodiment of the present disclosure provides a UAV shooting method, applied to a UAV shooting system. The system includes a UAV, the UAV being provided with a gimbal, a camera being installed on the gimbal. The method includes:
- determining position information of a target object in a framing picture of the camera, the position information including coordinate information and dimension information of the target object in the framing picture;
- determining a target heading angle of the UAV and a target pitch angle of the gimbal based on the position information;
- adjusting the UAV from an initial heading angle to the target heading angle and adjusting the gimbal from an initial pitch angle to the target pitch angle;
- determining a target shooting position based on a shooting mode of the camera and the position information; and
- flying to the target shooting position and controlling the camera to shoot the target object at the target shooting position.

According to a second aspect, an embodiment of the present disclosure provides a UAV shooting apparatus, integrated in a UAV shooting system. The system includes a UAV, the UAV being provided with a gimbal, a camera being installed on the gimbal. The apparatus includes:
- a target information determination module, configured to determine position information of a target object in a framing picture of the camera, the position information including coordinate information and dimension information of the target object in the framing picture;
- an angle information determination module, configured to determine a target heading angle of the UAV and a target pitch angle of the gimbal based on the position information;
- an angle adjustment module, configured to adjust the UAV from an initial heading angle to the target heading angle and adjust the gimbal from an initial pitch angle to the target pitch angle;
- a position information determination module, configured to determine a target shooting position based on a shooting mode of the camera and the position information; and
- a shooting control module, configured to fly to the target shooting position and control the camera to shoot the target object at the target shooting position.

According to a third aspect, an embodiment of the present disclosure provides a UAV. The UAV includes:
- one or more processors; and
- a storage apparatus, configured to store one or more programs,
- the one or more programs, when executed by the one or more processors, causing the one or more processors to implement the UAV shooting method according to any embodiment of the present disclosure.

According to a fourth aspect, an embodiment of the present disclosure provides a computer-readable storage medium, having a computer program stored thereon, the computer program, when executed by a processor, implementing the UAV shooting method according to any embodiment of the present disclosure.

BRIEF DESCRIPTION OF THE DRAWINGS

The accompanying drawings are intended to better understand this solution and do not constitute a limitation on the present disclosure. In the drawings.

DETAILED DESCRIPTION

To make objectives, technical solutions, and advantages of embodiments of the present disclosure clearer, the following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Before introduction of the embodiments of the present disclosure, it should be noted that an unmanned aerial vehicle (UAV) shooting method of the present disclosure is applied to a UAV shooting system. The system includes a UAV, a gimbal and a camera. The gimbal is a mechanical component installed on the UAV to mount the camera. A controller is configured in the UAV. The controller can control and adjust a heading angle of the UAV and a pitch angle of the gimbal, and can control the UAV to fly to a predetermined position. A mobile terminal is a device configured for a user and configured to transmit an instruction to control the UAV to the controller.

It should be noted that the user and a target object in this embodiment may or may not be a same person. The user and the target object being a same person means that the user takes a selfie by using a UAV The user and the target object being not a same person means that the user captures a portrait of the target object by using a UAV. The target object in this embodiment may be a person or an object such as a ship and a building. The target object in this embodiment may be at least one target object, that is, a plurality of persons, a plurality of objects and the like. Next, the UAV shooting method is described in detail.

Figure 1:
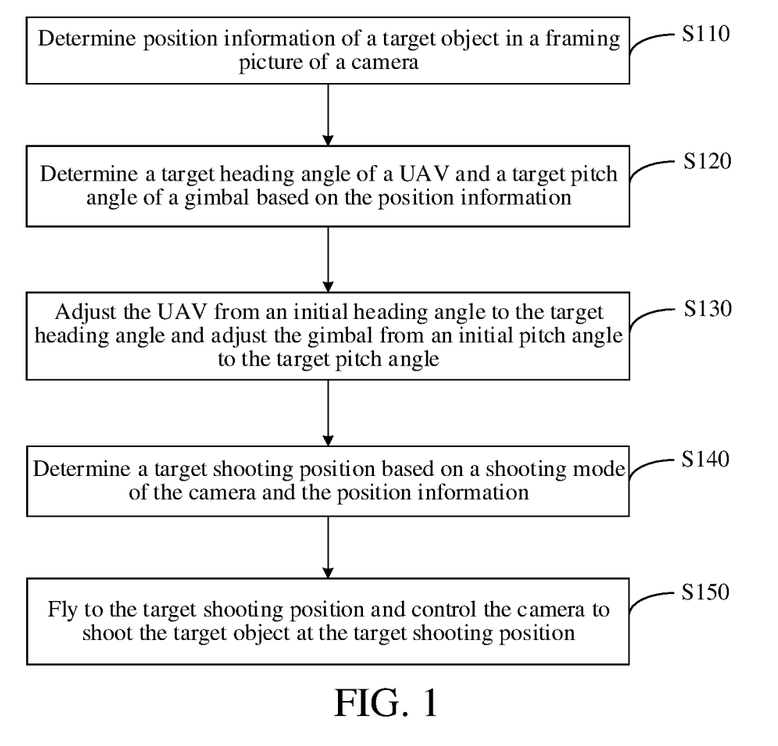
FIG. 1 is a first schematic flowchart of an unmanned aerial vehicle (UAV) shooting method according to an embodiment of the present disclosure.

FIG. 1 is a first schematic flowchart of a UAV shooting method according to an embodiment of the present disclosure. This embodiment may be applicable to a case where a target object is shot by using a UAV in different shooting modes. The UAV shooting method provided in this embodiment may be performed by a UAV shooting apparatus provided in this embodiment of the present disclosure. The apparatus may be implemented by software and/or hardware and integrated in an electronic device for performing the method. Preferably, the electronic device in this embodiment of the present disclosure may be a UAV. The UAV may be a quadrotor aircraft.

Referring to FIG. 1, the method in this embodiment includes but is not limited to the following steps.

S110: Determine position information of a target object in a framing picture of a camera.

In this embodiment of the present disclosure, after a user selects the target object on a mobile terminal, a controller of the UAV obtains positioning information of the target object from the mobile terminal and determines an initial heading angle of the UAV based on the positioning information. Then the controller adjusts the UAV from a current heading angle to the initial heading angle, so that the camera performs framing for the target object. The controller determines the position information of the target object in the framing picture of the camera. A specific process in which the controller obtains the positioning information of the target object and then determines the initial heading angle is to be described in detail in the following embodiments.

In this embodiment of the present disclosure, the position information includes coordinate information and dimension information of the target object in the framing picture. The coordinate information is two-dimensional coordinate information of the target object in a camera coordinate system. The dimension information is dimension information of a width and a height of the target object in the camera coordinate system.

A method for selecting the target object may be: autonomously identifying, by the UAV from a current framing picture, a plurality of candidate target objects that the user may want to track, and displaying the candidate target objects in a mobile terminal interface, for the user to select the target object from the candidate target objects. After the user selects the target object in the mobile terminal interface, the controller receives the target object selected by the user. A method for selecting the target object may alternatively be: transmitting, by the user, an image of the target object to the controller, and searching, by the controller, the current framing picture of the camera for the target object after receiving the image of the target object.

S120: Determine a target heading angle of the UAV and a target pitch angle of the gimbal based on the position information.

In this embodiment of the present disclosure, after the coordinate information and the dimension information of the target object in the framing picture of the camera are determined, the target heading angle of the UAV and the target pitch angle of the gimbal are determined based on the coordinate information. The advantage of this arrangement is that it may be ensured that the target object is located in an optimum position in the current framing picture of the camera. For example, the target object is located directly in the middle of the current framing picture of the camera. Optionally, the optimum position may also be a lower middle position of the current framing picture of the camera, and the optimum position is not specifically defined in the present disclosure. A person skilled in the art may determine the optimum position from positions in the framing picture as needed.

Since the gimbal is the mechanical component for mounting the camera, the pitch angle of the gimbal is also the pitch angle of the camera.

S130: Adjust the UAV from the initial heading angle to the target heading angle and adjust the gimbal from an initial pitch angle to the target pitch angle.

It may be understood that the current heading angle and the current pitch angle refers to the heading angle of the UAV and the pitch angle of the gimbal before the target object is tracked. The initial heading angle refers to a heading angle to which the UAV rotates the current heading angle for the first time to frame the target object within the framing picture of the camera. In this case, the pitch angle of the gimbal may or may not be rotated, depending on whether the target object can be framed within the framing picture of the camera only by rotating the heading angle. If the pitch angle of the gimbal needs to be rotated, the gimbal is adjusted from the current pitch angle to the initial pitch angle. If the pitch angle of the gimbal does not need to be rotated, the initial pitch angle of the gimbal is the current pitch angle. The target heading angle and the target pitch angle refer to a heading angle and a pitch angle to which the UAV rotates the current heading angle for the second time, to ensure the optimum position of the target object in the current framing picture of the camera.

In this embodiment of the present disclosure, after the target heading angle of the UAV and the target pitch angle of the gimbal are determined through step S120 described above, the controller respectively controls the UAV to adjust from the initial heading angle to the target heading angle and controls the gimbal to adjust from the initial pitch angle to the target pitch angle. The advantage of this arrangement is that the shooting angle of the UAV may be automatically and accurately adjusted by using the UAV, without the need for the user to adjust the shooting angle by using the mobile terminal (such as a remote-control handle), which resolves a problem that adjustment of the shooting angle is not accurate enough in the prior art and improves use sense of the user.

S140: Determine a target shooting position based on a shooting mode of the camera and the position information.

The shooting mode includes at least a shot size and an angle of view. The shot size includes at least a close-up shot, a close shot, a medium shot, a long shot and a full shot. The angle of view includes at least an eye-level view and a top-down view. The position information includes coordinate information and dimension information of the target object in the framing picture. The coordinate information is two-dimensional coordinate information of the target object in a camera coordinate system. The dimension information is dimension information of a width and a height of the target object in the camera coordinate system. Optionally, the eye-level view or the top-down view may be set as a default angle of view, and a certain shot size may be set as a default shot size.

In this embodiment of the present disclosure, different shooting modes correspond to different dimension information. For example, in a shooting mode, the shot size is a medium shot, and dimension information of the corresponding target object in a framing picture is 0.5. In addition, different shooting modes correspond to different target shooting positions. For example, in a shooting mode, the shot size is a medium shot, and the corresponding target shooing position of the UAV is at a straight-line distance of 5 meters from the target object. In this step, the dimension information of the target object in the framing picture is determined by using the shooting mode selected by the user. Then the target shooting position of the UAV is determined based on the shooting mode and the dimension information. In this step, both the shooting mode of the camera and the position information of the target object in the current framing picture are required to determine the target shooting position. The advantage of this arrangement is that the shooting position of the UAV may be accurately adjusted.

Further, the controller may determine a distance between the UAV and the target object based on the dimension information of the target object in the framing picture, and therefore may also determine whether the UAV flies to the target shooting position.

S150: Fly to the target shooting position and control the camera to shoot the target object at the target shooting position.

In this embodiment of the present disclosure, after the target shooting position of the UAV is determined through step S140 described above, the controller controls the UAV to fly to the target shooting position. The user transmits a shooting instruction to the controller by using the mobile terminal. The controller controls the camera to shoot the target object at the target shooting position after receiving the shooting instruction transmitted by the mobile terminal.

Through the technical solution provided in this embodiment, the position information of the target object in the framing picture of the camera is determined. The target heading angle of the UAV and the target pitch angle of the gimbal are determined based on the position information. The UAV is adjusted from the initial heading angle to the target heading angle and the gimbal is adjusted from the initial pitch angle to the target pitch angle. The target shooting position is determined based on the shooting mode of the camera and the position information. The controller controls the UAV to fly to the target shooting position and controls the camera to shoot the target object at the target shooting position. According to the present disclosure, the heading angle of the UAV and the pitch angle of the gimbal are adjusted by using the position information of the target object in the framing picture of the camera, so that the shooting angle can be accurately adjusted. In addition, the shooting position of the UAV is accurately adjusted by using the position information of the target object in the framing picture of the camera and a shooting mode selected by a user. Therefore, through implementation of the technical solution of the present disclosure, it is helpful for the user to compose a captured image of the target object, thereby improving user experience.

Figure 2:
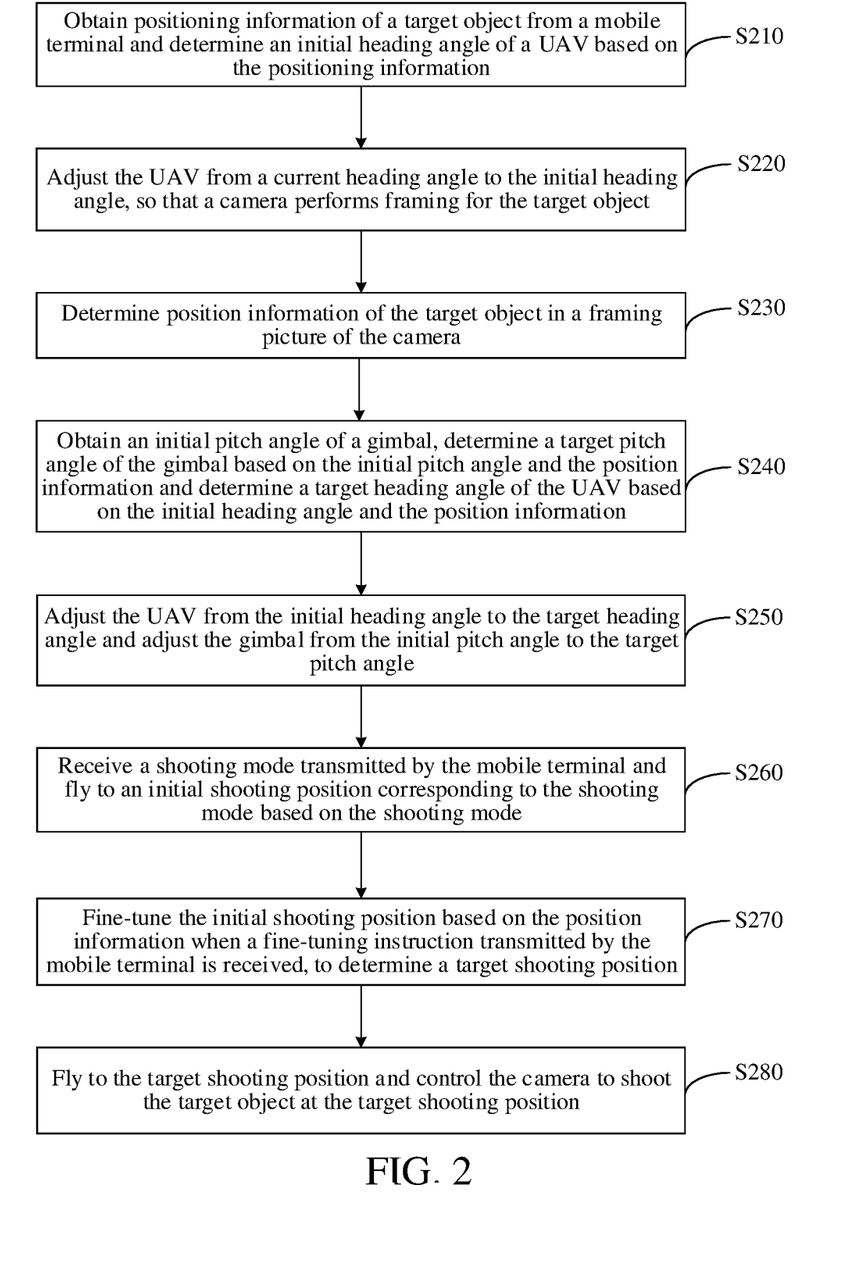
FIG. 2 is a second schematic flowchart of a UAV shooting method according to an embodiment of the present disclosure.

FIG. 2 is a second schematic flowchart of a UAV shooting method according to an embodiment of the present disclosure. This embodiment of the present disclosure is optimized based on the embodiment described above. Specific optimization is as follows: In this embodiment, a determination process of an initial heading angle, a determination process of a target pitch angle and a target heading angle and a determination process of a target shooting position are described in detail. Optionally, a method of executing a process of fine-tuning the target shooting position and tracking a target is described.

Referring to FIG. 2, the method in this embodiment includes but is not limited to the following steps.

S210: Obtain positioning information of the target object from a mobile terminal and determine an initial heading angle of a UAV based on the positioning information.

A current heading angle is a heading angle of the UAV before the target object is tracked. The initial heading angle refers to a heading angle to which the UAV rotates the current heading angle for the first time, so that a camera can be oriented toward the target object and can perform framing for the target object.

In this embodiment of the present disclosure, after a user selects the target object on a mobile terminal, a controller of the UAV obtains the positioning information of the target object from the mobile terminal. The positioning information may be obtained in the following manner: If the user and the target object are the same person, positioning information of the mobile terminal is obtained. To be specific, the positioning information of the target object is obtained. If the user and the target object are not the same person, the user may input the positioning information of the target object into the mobile terminal, so that the controller obtains the positioning information of the target object. Optionally, the positioning information of the target object may also be obtained by using another method for obtaining the positioning information in the prior art.

In this embodiment of the present disclosure, after the positioning information of the target object is obtained, the initial heading angle of the UAV is determined based on the positioning information. A method for determining the initial heading angle may be: first determining a straight-line distance between the UAV and the target object and then calculating a rotation angle (that is, the initial heading angle) corresponding to the current heading angle based on the current heading angle of the UAV, so that after the current heading angle of the UAV is rotated by the rotation angle, the target object can appear in a framing picture of the camera. The determining the initial heading angle in this step is substantially making preliminary adjustment to the shooting angle of the UAV.

Optionally, if the target object still cannot appear in the framing picture of the camera (for example, a part of the target object appears in the framing picture, and an other part appears outside the framing picture) after the heading angle is rotated to the initial heading angle, the current pitch angle of the gimbal may also be rotated to the initial pitch angle, so that the target object can appear in the framing picture of the camera. A method for determining the initial pitch angle is the same as the method for determining the initial heading angle. Details are not described herein.

Optionally, after the positioning information of the target object is obtained from the mobile terminal, a straight-line distance between a current position and a position of the mobile terminal is calculated if a current state of the UAV is flying. If the straight-line distance is greater than a preset distance, an inquiry message is transmitted to the mobile terminal. The inquiry message is used for confirming with the user whether to track the target object. An advantage of this arrangement is to prevent the user from losing control of the UAV due to a relatively large distance between the UAV and the user.

S220: Adjust the UAV from the current heading angle to the initial heading angle, so that the camera performs framing for the target object.

In this embodiment of the present disclosure, after the initial heading angle of the UAV is determined through step S210 described above, the controller controls the UAV to adjust from the current heading angle to the initial heading angle, so that the camera performs framing for the target object.

Optionally, to enable the target object to appear in the framing picture of the camera, if not only the heading angle but also the pitch angle of the gimbal need to be rotated, the controller also needs to control the gimbal to adjust from the current pitch angle to the initial pitch angle.

S230: Determine position information of the target object in the framing picture of the camera.

In this embodiment of the present disclosure, after the gimbal of the UAV is oriented toward the target object, so that the target object appears in the framing picture of the camera, the controller also needs to determine the position information of the target object in the framing picture of the camera. The position information includes coordinate information and dimension information of the target object in the framing picture. The coordinate information is two-dimensional coordinate information of the target object in a camera coordinate system. The dimension information is dimension information of a width and a height of the target object in the camera coordinate system. Optionally, the dimension information of the width and the height may be a dimension value of the width and a dimension value of the height, or may be a ratio of the width to the height.

S240: Obtain the initial pitch angle of the gimbal, determine a target pitch angle of the gimbal based on the initial pitch angle and the position information and determine the target heading angle of the UAV based on the initial heading angle and the position information.

In this embodiment of the present disclosure, after the coordinate information and the dimension information of the target object in the framing picture of the camera are determined, the target heading angle of the UAV and the target pitch angle of the gimbal are determined based on the coordinate information. Specifically, the initial pitch angle of the gimbal is obtained first. Then a rotation angle (that is, the target pitch angle) corresponding to the initial pitch angle is calculated based on the initial pitch angle and the coordinate information and/or the dimension information of the target object in the framing picture of the camera, to ensure an optimum position of the target object in the framing picture of the camera. Optionally, the target pitch angle of the gimbal may also be calculated based on the initial pitch angle, a field of view of the camera and the coordinate information and/or the dimension information of the target object in the framing picture of the camera. It should be noted that when setting parameters (such as a focal length) of the camera are different, the field of view of the camera is different, and the final calculated target pitch angle is also different.

For example, the coordinate information of the target object in the framing picture of the camera is (−1, −1). If coordinate information of the optimum position is (0, 0), a rotation angle between the initial pitch angle and the target pitch angle may be calculated based on the field of view of the camera and the coordinate information and/or the dimension information of the target object in the framing picture of the camera. In this way, after the gimbal rotates to the target pitch angle, the coordinate information of the target object in the framing picture of the camera is (0, 0).

In this embodiment of the present disclosure, the initial heading angle of the UAV is obtained first. Then a rotation angle (that is, the target heading angle) corresponding to the initial heading angle is calculated based on the initial heading angle and the coordinate information and/or the dimension information of the target object in the framing picture of the camera, to ensure the optimum position of the target object in the framing picture of the camera. The step of determining the target heading angle is essentially a step of making fine adjustment to the shooting angle of UAV based on preliminary adjustment.

The advantage of this arrangement in this step is that it may be ensured that the target object is in an optimum position in a current framing picture of the camera, so that the shooting angle of the camera is an optimum shooting angle. Optionally, the optimum position may be a middle position of the framing picture, or may be a lower middle position of the framing picture.

The optimum position is not specifically defined in the present disclosure.

S250: Adjust the UAV from the initial heading angle to the target heading angle and adjust the gimbal from an initial pitch angle to the target pitch angle.

S260: Receive a shooting mode transmitted by the mobile terminal, and fly to an initial shooting position corresponding to the shooting mode based on the shooting mode.

The shooting mode includes at least a shot size and an angle of view. The shot size includes at least a close-up shot, a close shot, a medium shot, a long shot and a full shot. The angle of view includes at least an eye-level view and a top-down view.

In this embodiment of the present disclosure, if the shooting mode transmitted by the mobile terminal is different, the dimension information of the target object in the framing picture is also different. Therefore, the corresponding target shooting position is also different.

The user transmits the shooting mode to the controller by using the mobile terminal. The controller controls the UAV to fly to the initial shooting position corresponding to the shooting mode based on the shooting mode after receiving the shooting mode transmitted by the mobile terminal. The determining the initial shooting position in this step is substantially making preliminary adjustment to the shooting position of the UAV Optionally, after the UAV flies to the initial shooting position corresponding to the shooting mode, if the current shooting angle is not the optimum shooting angle, the heading angle of the UAV or the pitch angle of the gimbal may also be adjusted to achieve the optimum shooting angle. The purpose is to ensure that the target object is located in the optimum position in the current framing picture no matter how the position of the UAV moves, so that the shooting angle of the camera is the optimum shooting angle.

In this embodiment of the present disclosure, the purpose of controlling the UAV to fly to the initial shooting position corresponding to the shooting mode is to cause an effect of the target object in the framing picture of the camera (such as the dimension information of the target object in the framing picture) to satisfy an effect corresponding to the shooting mode. To achieve this purpose, in addition to controlling the UAV to fly to the initial shooting position corresponding to the shooting mode, the focal length of the camera may also be controlled to change. Optionally, the UAV may also be controlled to fly to the initial shooting position corresponding to the shooting mode and the focal length of the camera is controlled to change to achieve this purpose.

S270: Fine-tune the initial shooting position based on the position information when a fine-tuning instruction transmitted by the mobile terminal is received, to determine the target shooting position.

In this embodiment of the present disclosure, after the UAV flies to the initial shooting position corresponding to the shooting mode, if the user is not satisfied with the initial shooting position, the fine-tuning instruction needs to be transmitted by using the mobile terminal. When the controller receives the fine-tuning instruction transmitted by the mobile terminal, the initial shooting position is fine-tuned based on the coordinate information and/or the dimension information of the target object in the current framing picture of the camera, to determine the target shooting position. The determining the target shooting position in this step is substantially making fine adjustment to the shooting position of the UAV based on the preliminary adjustment.

Further, when the UAV is switched among different shooting modes (such as different shot sizes), a threshold may be set for the dimension information of the target object in the framing picture. For example, when the shot size is a medium shot, a width-height ratio of the dimension information is 0.5, and the corresponding threshold is set to [0.45, 0.55]. When the shot is switched from a close shot to the medium shot, the dimension information changes from large to small. When the variation is 0.55, it may be considered that the shot size has been switched from the close shot to the medium shot. When the shot is switched from a long shot to the medium shot, the dimension information changes from small to large. When the variation is 0.45, it may be considered that the shot size has been switched from the long shot to the medium shot.

S280: Fly to the target shooting position and control the camera to shoot the target object at the target shooting position.

Optionally, if the position of the target object moves when the UAV flies to the target shooting position, the corresponding target shooting position may also move accordingly, and the target shooting position needs to be readjusted. Therefore, after the UAV flies to the target shooting position, a detection as to whether a shooting parameter corresponding to the target shooting position satisfies the shooting parameter corresponding to the shooting mode also needs to be performed. If not, a prompt message is transmitted to the mobile terminal. The prompt message is used for prompting a user whether to fine-tune the target shooting position to achieve the shooting parameter corresponding to the shooting mode. The advantage of this arrangement is that through the detection as to whether the shooting parameter corresponding to the target shooting position satisfies the shooting parameter corresponding to the shooting mode, the position of the target object may be prevented from moving, and the target shooting position does not move accordingly, which causes a problem that the shooting parameter corresponding to the target shooting position does not satisfy the shooting parameter corresponding to the shooting mode.

Optionally, if the position of the target object moves to a very great extent when the UAV flies to the target shooting position, the target object may be not in the framing picture of the camera. To be specific, the UAV loses track of the target object, and the heading angle of the UAV needs to be readjusted. Therefore, a detection as to whether the target object is in the framing picture of the camera needs to be performed in real time. If not, the positioning information of the target object is re-obtained and the heading angle is readjusted based on the positioning information.

It should be noted that according to the present disclosure, two adjustments (that is, the preliminary adjustment and the fine adjustment) are required for the shooting angle and the shooting position. The preliminary adjustment is made first and then the fine adjustment is made based on the preliminary adjustment. The advantage of this arrangement is that the shooting angle and the shooting position may be adjusted more accurately.

Through the technical solution provided in this embodiment, the initial heading angle of the UAV is determined by obtaining the positioning information of the target object first. Then the UAV is adjusted from the current heading angle to the initial heading angle, so that the camera performs framing for the target object, and the position information of the target object in the framing picture of the camera is determined. Next, the initial pitch angle of the gimbal is obtained. The target pitch angle of the gimbal is determined based on the initial pitch angle and the position information. The target heading angle of the UAV is determined based on the initial heading angle and the position information. The UAV is adjusted from the initial heading angle to the target heading angle and the gimbal is adjusted from the initial pitch angle to the target pitch angle. Next, the UAV flies to the initial shooting position corresponding to the shooting mode based on the shooting mode. When the fine-tuning instruction transmitted by the mobile terminal is received, the initial shooting position is fine-tuned based on the position information to determine the target shooting position, and the camera is controlled to shoot the target object at the target shooting position. According to the present disclosure, the heading angle of the UAV and the pitch angle of the gimbal are adjusted by using the position information of the target object in the framing picture of the camera, so that the shooting angle can be accurately adjusted. In addition, the shooting position of the UAV is accurately adjusted by using the position information of the target object in the framing picture of the camera and a shooting mode selected by a user. Therefore, through implementation of the technical solution of the present disclosure, it is helpful for the user to compose a captured image of the target object, thereby improving user experience.

Figure 3:
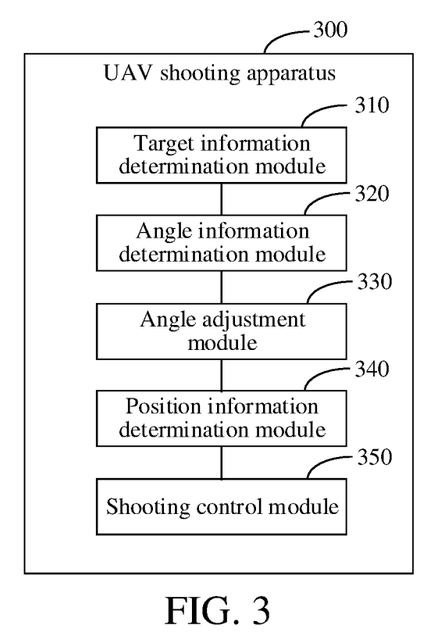
FIG. 3 is a schematic structural diagram of a UAV shooting apparatus according to an embodiment of the present disclosure.

FIG. 3 is a schematic structural diagram of a UAV shooting apparatus according to an embodiment of the present disclosure. As shown in FIG. 3, the apparatus 300 may include:

- a target information determination module 310, configured to determine position information of a target object in a framing picture of the camera, the position information including coordinate information and dimension information of the target object in the framing picture;
- an angle information determination module 320, configured to determine a target heading angle of the UAV and a target pitch angle of the gimbal based on the position information;
- an angle adjustment module 330, configured to adjust the UAV from an initial heading angle to the target heading angle and adjust the gimbal from an initial pitch angle to the target pitch angle;
- a position information determination module 340, configured to determine a target shooting position based on a shooting mode of the camera and the position information; and a shooting control module 350, configured to fly to the target shooting position and control the camera to shoot the target object at the target shooting position.

Further, the UAV shooting apparatus described above may further include an initial angle determination module.

The initial angle determination module is configured to: obtain positioning information of the target object from a mobile terminal before the position information of the target object in the framing picture of the camera is determined, and determine the initial heading angle of the UAV based on the positioning information; and adjust the UAV from a current heading angle to the initial heading angle, so that the camera performs framing for the target object.

Further, the position information determination module 340 described above is further configured to: receive the shooting mode transmitted by the mobile terminal and fly to an initial shooting position corresponding to the shooting mode based on the shooting mode; and fine-tune the initial shooting position based on the position information when a fine-tuning instruction transmitted by the mobile terminal is received, to determine the target shooting position.

Further, the angle information determination module 320 described above is further configured to: obtain the initial pitch angle of the gimbal; determine the target pitch angle of the gimbal based on the initial pitch angle and the position information; and determine the target heading angle of the UAV based on the initial heading angle and the position information.

Further, the UAV shooting apparatus described above may further include a distance determination module.

The distance determination module is configured to: calculate, after the positioning information of the target object is obtained from the mobile terminal, a straight-line distance between a current position and a position of the mobile terminal if a current state is flying; and transmit an inquiry message to the mobile terminal if the straight-line distance is greater than a preset distance, the inquiry message being used for confirming with a user whether to track the target object.

Further, the UAV shooting apparatus described above may further include a position adjustment module.

The position adjustment module is configured to: detect, after the target shooting position is determined based on the shooting mode of the camera and the position information, whether a shooting parameter corresponding to the target shooting position satisfies a shooting parameter corresponding to the shooting mode, and if not, transmit a prompt message to the mobile terminal, the prompt message being used for prompting a user whether to fine-tune the target shooting position to achieve the shooting parameter corresponding to the shooting mode.

Further, the UAV shooting apparatus described above may further include a heading angle adjustment module.

The heading angle adjustment module is configured to: detect, after the target shooting position is determined based on the shooting mode of the camera and the position information, whether the target object is in the framing picture of the camera, and if not, re-obtain the positioning information of the target object and readjust a heading angle based on the positioning information.

The UAV shooting apparatus provided in this embodiment may be applicable to the UAV shooting method provided in any of the embodiments described above, and has corresponding functions and beneficial effects.

Figure 4:
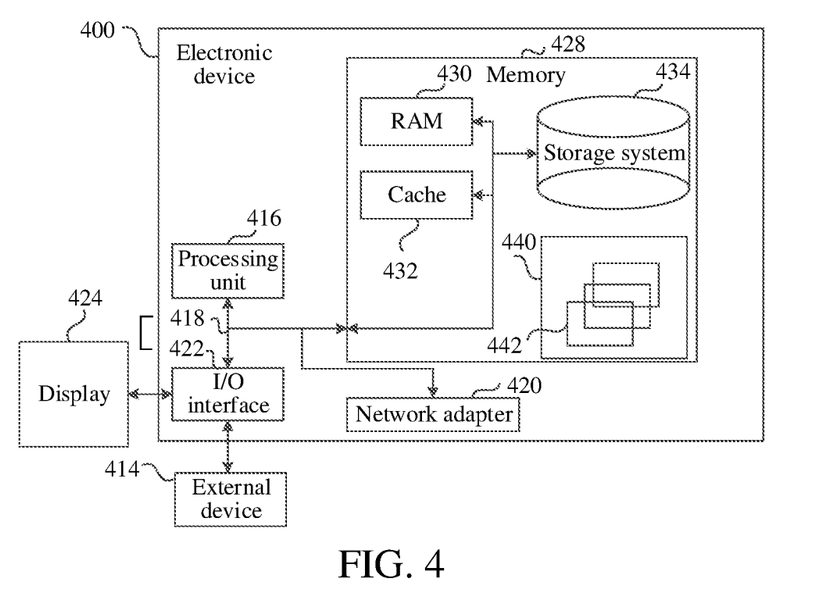
FIG. 4 is a block diagram of an electronic device configured to implement a UAV shooting method according to an embodiment of the present disclosure.

FIG. 4 is a block diagram of an electronic device configured to implement a UAV shooting method according to an embodiment of the present disclosure. FIG. 4 shows a block diagram of an exemplary electronic device configured to implement an implementation of an embodiment of the present disclosure. The electronic device shown in FIG. 4 is merely an example and should not constitute any limitation on the functions and usage scope of the embodiments of the present disclosure. The electronic device in this embodiment of the present disclosure may be a UAV. The UAV may be a quadrotor aircraft.

As shown in FIG. 4, the electronic device 400 is represented in the form of a general-purpose computing device. Components of the electronic device 400 may include, but are not limited to one or more processors or processing units 416, a memory 428, and a bus 418 that connects different system components (including the memory 428 and the processing units 416).

The bus 418 represents one or more of a plurality of types of bus structures, including a storage bus or a storage controller, a peripheral bus, a graphics acceleration port, a processor or a local bus that uses any of a plurality of bus structures. For example, these architectures include, but are not limited to, an industry standard architecture (ISA) bus, a micro channel architecture (MAC) bus, an enhanced ISA bus, a video electronics standards association (VESA) local bus and a peripheral component interconnect (PCI) bus.

The electronic device 400 typically includes a plurality of computer system-readable media. The media may be any available media that can be accessed by the electronic device 400, including volatile and nonvolatile media and removable and non-removable media.

The memory 428 may include a computer system-readable medium in the form of a volatile memory, for example, a random access memory (RAM) 430 and/or a cache memory 432. The electronic device 400 may further include another removable/non-removable computer system storage medium and volatile/nonvolatile computer system storage medium.

As an example only, a storage system 434 may be configured to read from and write to non-removable and non-volatile magnetic media (not shown in FIG. 4, which is usually referred to as a "hard disk drive"). Although not shown in FIG. 4, a magnetic disk drive configured to read from and write to a removable non-volatile magnetic disk (for example, a "floppy disk"), and an optical disk drive configured to read from and write to a removable non-volatile optical disk (for example, a CD-ROM, a DVD-ROM or another optical medium) may be provided. In these cases, each drive may be connected to the bus 418 through one or more data medium interfaces. The memory 428 may include at least one program product. The program product has a set of (for example, at least one) program modules. These program modules are configured to perform the functions of the embodiments of the present disclosure.

A program/utility tool 440 having a set of (at least one) program modules 442 may be stored, for example, in the memory 428. Such program modules 442 include, but are not limited to, an operating system, one or more applications, another program module and program data. Each of such examples or a combination thereof may include an implementation of a network environment. The program modules 442 usually perform the functions and/or methods of embodiments described in the embodiments of the present disclosure.

The electronic device 400 may also communicate with one or more external devices 414 (such as a keyboard, a pointing device and a display 424) and may also communicate with one or more devices that enable a user to interact with the electronic device 400, and/or any device (for example, a network card or a modem) that enables the electronic device 400 to communicate with one or more other computing devices. Such communication may be performed by using an input/output (I/O) interface 422. In addition, the electronic device 400 may further communicate with one or more networks (such as a local area network (LAN), a wide area network (WAN) and/or a public network such as the Internet) through a network adapter 420. As shown in FIG. 4, the network adapter 420 communicates with another module of the electronic device 400 by using the bus 418. It should be understood that although not shown in FIG. 4, another hardware and/or software module may be used in combination with the electronic device 400, including but not limited to microcode, a device drive, a redundant processing unit, an external disk drive array, a RAID system, a tape drive, a data backup storage system and the like.

The processing unit 416 executes various functional applications and data processing by running a program stored in the memory 428, for example, implementing the UAV shooting method provided in any embodiment of the present disclosure.

Embodiment of the present disclosure further provides a computer-readable storage medium, having a computer program (or referred to as a computer-executable instruction) stored thereon. The program, when executed by a processor, may be used for performing the UAV shooting method provided in any of the embodiments of the present disclosure described above.

The computer-readable storage medium in this embodiment of the present disclosure may adopt any combination of one or more computer-readable media. The computer-readable medium may be a computer-readable signal medium or a computer-readable storage medium. The computer-readable storage medium may be, for example, but is not limited to, an electric, magnetic, optical, electromagnetic, infrared, or semi-conductive system, apparatus, or device, or any combination of the above. More specific examples (a non-exhaustive list) of the computer-readable storage medium include: an electrical connection by one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical memory device, a magnetic memory device or any appropriate combination thereof. In this document, the computer-readable storage medium may be any tangible medium including or storing a program. The program may be used by or in combination with an instruction execution system, apparatus or device.

The computer-readable signal medium may include a data signal included in a baseband or transmitted as a part of a carrier, which carries computer-readable program code. Such propagated data signals may adopt various forms, including but not limited to an electromagnetic signal, an optical signal or any appropriate combination thereof. The computer-readable signal medium may further be any computer-readable medium other than the computer-readable storage medium. The computer-readable medium may send, propagate or transmit the program used by or in combination with the instruction execution system, apparatus or device.

The program code included in the computer-readable medium may be transmitted using any suitable medium, including but not limited to, wireless, a wire, an optical cable, RF or the like, or any suitable combination described above.

Computer program code for performing the operations of embodiments of the present disclosure may be written by using one or more programming languages or a combination thereof. The programming language includes an object-oriented programming language such as Java, Smalltalk, C++, and also includes a conventional procedural programming language such as "C" Language or a similar programming language. The program code may be completely executed on a user computer, partially executed on a user computer, executed as an independent software package, partially executed on a user computer and partially executed on a remote computer, or completely executed on a remote computer or server. In a situation involving the remote computer, the remote computer may be connected to the user computer by using any type of network including a local area network (LAN) or a wide area network (WAN), or may be connected to an external computer (for example, connected to the external computer through the Internet by using an Internet service provider).

What is claimed is:

1. An unmanned aerial vehicle (UAV) shooting method, applied to a UAV shooting system, the system comprising a UAV, the UAV being provided with a gimbal, a camera being installed on the gimbal, and the method comprising:

determining position information of a target object in a framing picture of the camera, the position information including coordinate information and dimension information of the target object in the framing picture;

determining a target heading angle of the UAV and a target pitch angle of the gimbal based on the position information; adjusting the UAV from an initial heading angle to the target heading angle and adjusting the gimbal from an initial pitch angle to the target pitch angle;

determining a target shooting position based on a shooting mode of the camera and the position information, the shooting mode of the camera including at least a shot size and an angle of view, the shot size including at least a close-up shot, a close shot, a medium shot, a long shot and a full shot, the angle of view including at least an eye-level view and a top-down view, and different shooting modes corresponding to different dimension information of the target object in the framing picture; and flying to the target shooting position and controlling the camera to shoot the target object at the target shooting position.

2. The UAV shooting method according to claim 1, wherein before the determining position information of the target object in the framing picture of the camera, the method further comprises:

obtaining positioning information of the target object from a mobile terminal and determining the initial heading angle of the UAV based on the positioning information; and adjusting the UAV from a current heading angle to the initial heading angle, so that the camera performs framing for the target object.

3. The UAV shooting method according to claim 1, wherein the determining the target shooting position based on the shooting mode of the camera and the position information comprises:

receiving the shooting mode transmitted by a mobile terminal;

determining the dimension information of the target object in the framing picture according to the shot size of the shooting mode;

determining an initial shooting position according to the shooting mode and the dimension information of the target object in the framing picture;

flying to the initial shooting position corresponding to the shooting mode; and fine-tuning the initial shooting position based on the position information when a fine-tuning instruction transmitted by the mobile terminal is received, to determine the target shooting position.

4. The UAV shooting method according to claim 1, wherein the determining the target heading angle of the UAV and the target pitch angle of the gimbal based on the position information comprises:

obtaining the initial pitch angle of the gimbal; and determining the target pitch angle of the gimbal based on the initial pitch angle and the position information; and determining the target heading angle of the UAV based on the initial heading angle and the position information.

5. The UAV shooting method according to claim 2, wherein after the obtaining positioning information of the target object from the mobile terminal, the method further comprises:

calculating a straight-line distance between a current position of the UAV and a position of the mobile terminal when a current state of the UAV is flying; and transmitting an inquiry message to the mobile terminal when the straight-line distance is greater than a preset distance, the inquiry message is configured to confirm with a user whether to track the target object.

6. The UAV shooting method according to claim 1, wherein after the determining the target shooting position based on the shooting mode of the camera and the position information, the method further comprises:

detecting whether a shooting parameter corresponding to the target shooting position satisfies a shooting parameter corresponding to the shooting mode, and when the target shooting position doesn't satisfy a shooting parameter corresponding to the shooting mode, transmitting a prompt message to the mobile terminal, the prompt message is configured to prompt a user whether to fine-tune the target shooting position to achieve the shooting parameter corresponding to the shooting mode.

7. The UAV shooting method according to claim 2, wherein after the determining the target shooting position based on the shooting mode of the camera and the position information, the method further comprises:

detecting whether the target object is in the framing picture of the camera, and when the target object is not in the framing picture of the camera, re-obtaining the positioning information of the target object and readjusting the target heading angle based on the positioning information.

8. An unmanned aerial vehicle (UAV) shooting apparatus, integrated in a UAV shooting system, the system comprising a UAV, the UAV being provided with a gimbal, a camera being installed on the gimbal, and the apparatus comprising:

a target information determination unit, configured to determine position information of a target object in a framing picture of the camera, the position information including coordinate information and dimension information of the target object in the framing picture;

an angle information determination unit, configured to determine a target heading angle of the UAV and a target pitch angle of the gimbal based on the position information;

an angle adjustment unit, configured to adjust the UAV from an initial heading angle to the target heading angle and adjust the gimbal from an initial pitch angle to the target pitch angle;

a position information determination unit, configured to determine a target shooting position based on a shooting mode of the camera and the position information, the shooting mode of the camera including at least a shot size and an angle of view, the shot size including at least a close-up shot, a close shot, a medium shot, a long shot and a full shot, the angle of view including at least an eye-level view and a top-down view, and different shooting modes corresponding to different dimension information of the target object in the framing picture; and a shooting control unit, configured to control the UAV to fly to the target shooting position and control the camera to shoot the target object at the target shooting position.

9. The UAV shooting apparatus according to claim 8, wherein the target information determination unit further configured to:

obtain positioning information of the target object from a mobile terminal and determine the initial heading angle of the UAV based on the positioning information; and adjust the UAV from a current heading angle to the initial heading angle, so that the camera performs framing for the target object.

10. The UAV shooting apparatus according to claim 8, wherein the angle information determination unit is further configured to:

receive the shooting mode transmitted by a mobile terminal;

determining the dimension information of the target object in the framing picture according to the shot size of the shooting mode;

determining an initial shooting position according to the shooting mode and the dimension information of the target object in the framing picture;

fly to the initial shooting position corresponding to the shooting mode; and fine-tuning the initial shooting position based on the position information when a fine-tuning instruction transmitted by the mobile terminal is received, to determine the target shooting position.

11. The UAV shooting apparatus according to claim 9, wherein the target information determination unit further configured to:

calculate a straight-line distance between a current position of the UAV and a position of the mobile terminal when a current state of the UAV is flying; and transmit an inquiry message to the mobile terminal when the straight-line distance is greater than a preset distance, the inquiry message is configured to confirm with a user whether to track the target object.

12. The UAV shooting apparatus according to claim 8, wherein the position information determination unit is further configured to:

detect whether a shooting parameter corresponding to the target shooting position satisfies a shooting parameter corresponding to the shooting mode, and when the target shooting position doesn't satisfy a shooting parameter corresponding to the shooting mode, transmit a prompt message to the mobile terminal, the prompt message is configured to prompt a user whether to fine-tune the target shooting position to achieve the shooting parameter corresponding to the shooting mode.

13. The UAV shooting apparatus according to claim 9, wherein the position information determination unit is further configured to:
 detect whether the target object is in the framing picture of the camera, and when the target object is not in the framing picture of the camera, re-obtain the positioning information of the target object and readjust the target heading angle based on the positioning information.

14. An unmanned aerial vehicle (UAV), comprising:
 a gimbal;
 a camera installed on the gimbal;
 one or more processors; and
 a storage apparatus, configured to store one or more programs, the one or more programs, when executed by the one or more processors, causing the one or more processors to implement a UAV shooting method, the UAV shooting method including:
 determining position information of a target object in a framing picture of the camera, the position information including coordinate information and dimension information of the target object in the framing picture;
 determining a target heading angle of the UAV and a target pitch angle of the gimbal based on the position information;
 adjusting the UAV from an initial heading angle to the target heading angle and adjusting the gimbal from an initial pitch angle to the target pitch angle;
 determining a target shooting position based on a shooting mode of the camera and the position information, the shooting mode of the camera including at least a shot size and an angle of view, the shot size including at least a close-up shot, a close shot, a medium shot, a long shot and a full shot, the angle of view including at least an eye-level view and a top-down view, and different shooting modes corresponding to different dimension information of the target object in the framing picture; and
 flying to the target shooting position and controlling the camera to shoot the target object at the target shooting position.

15. The UAV according to claim 14, wherein before the determining position information of the target object in the framing picture of the camera, the UAV shooting method further comprises:
 obtaining positioning information of the target object from a mobile terminal and determining the initial heading angle of the UAV based on the positioning information; and
 adjusting the UAV from a current heading angle to the initial heading angle, so that the camera performs framing for the target object.

16. The UAV according to claim 14, wherein the determining the target shooting position based on shooting mode of the camera and the position information comprises:
 receiving the shooting mode transmitted by a mobile terminal;
 determining the dimension information of the target object in the framing picture according to the shot size of the shooting mode;
 determining an initial shooting position according to the shooting mode and the dimension information of the target object in the framing picture;
 flying to the initial shooting position corresponding to the shooting mode; and
 fine-tuning the initial shooting position based on the position information when a fine-tuning instruction transmitted by the mobile terminal is received, to determine the target shooting position.

17. The UAV according to claim 15, wherein after the obtaining positioning information of the target object from the mobile terminal, the UAV shooting method further comprises:
 calculating a straight-line distance between a current position of the UAV and a position of the mobile terminal when a current state of the UAV is flying; and
 transmitting an inquiry message to the mobile terminal when the straight-line distance is greater than a preset distance, the inquiry message is configured to confirm with a user whether to track the target object.

18. The UAV according to claim 15, wherein after the determining the target shooting position based on the shooting mode of the camera and the position information, the UAV shooting method further comprises:
 detecting whether a shooting parameter corresponding to the target shooting position satisfies a shooting parameter corresponding to the shooting mode, and when the target shooting position doesn't satisfy a shooting parameter corresponding to the shooting mode, transmitting a prompt message to the mobile terminal, the prompt message is configured to prompt a user whether to fine-tune the target shooting position to achieve the shooting parameter corresponding to the shooting mode.

19. The UAV shooting method according to claim 1, wherein the target object in the framing picture of the camera is selected by:
 identifying, by the UAV from the framing picture of the camera, a plurality of candidate target objects;
 transmitting the framing picture comprising the candidate target objects to a mobile terminal to display for a user to select; and
 receiving a signal that the target object is selected from the candidate target objects by the user.

20. The UAV shooting method according to claim 1, wherein the target object in the framing picture of the camera is determined by:
 receiving an image of the target object from a mobile terminal; and
 searching the framing picture of the camera according to the image of the target object to determine the target object.

* * * * *